(12) United States Patent
Tillotson

(10) Patent No.: US 7,574,916 B2
(45) Date of Patent: Aug. 18, 2009

(54) USING THERMAL BURSTS TO APPLY A COMBINED SHOCK WAVEFRONT TO STRUCTURAL BONDS

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 413 days.

(21) Appl. No.: 11/353,407

(22) Filed: Feb. 14, 2006

(65) Prior Publication Data

US 2009/0100934 A1 Apr. 23, 2009

(51) Int. Cl.
*G01N 29/04* (2006.01)
(52) U.S. Cl. .............................. 73/588; 73/789; 73/827
(58) Field of Classification Search ................... 73/588, 73/801, 778–788, 815, 827, 841–859, 789
See application file for complete search history.

(56) References Cited

U.S. PATENT DOCUMENTS

| | | | | |
|---|---|---|---|---|
| 2,694,924 | A | * | 11/1954 | Matlock et al. ................. 73/37 |
| 5,698,787 | A | * | 12/1997 | Parzuchowski et al. ....... 73/643 |
| 5,895,589 | A | | 4/1999 | Rogers et al. |
| 6,512,584 | B1 | * | 1/2003 | O'Loughlin et al. ........ 356/388 |
| 6,558,493 | B1 | | 5/2003 | Ledger et al. |
| 6,622,568 | B2 | | 9/2003 | Nelson et al. |
| 6,716,297 | B2 | | 4/2004 | Essig et al. |
| 6,848,321 | B2 | * | 2/2005 | Bossi et al. .................... 73/842 |
| 6,983,660 | B2 | * | 1/2006 | Kwon .......................... 73/806 |
| 7,107,118 | B2 | * | 9/2006 | Orozco et al. ............... 700/166 |
| 2005/0120803 | A1 | * | 6/2005 | Sokol et al. ................... 73/801 |

OTHER PUBLICATIONS

Greg P. Carman, Structural & Solid Mechancs MAE Department UCLA.
Bossi et al., Laser Bond Inspection Device for Composites, Jun. 2004.
Bossi et al., Application of Stress Waves to Bond Inspection, May 16-20, 2004.
Bossi et al., Using Shock Loads to Measure Bonded Joint Strength, Nov. 2002.

* cited by examiner

*Primary Examiner*—Hezron Williams
*Assistant Examiner*—J M Saint Surin
(74) *Attorney, Agent, or Firm*—Harness, Dickey & Pierce, P.L.C.

(57) ABSTRACT

A system for applying a controlled stress on a joint in a structure includes means for applying a plurality of thermal bursts in a designated timing sequence and trajectory pattern to produce a combined shock wavefront directed toward the joint. This system can provide increased accuracy in measuring the strength and quality of composite bonds and laminations.

21 Claims, 5 Drawing Sheets

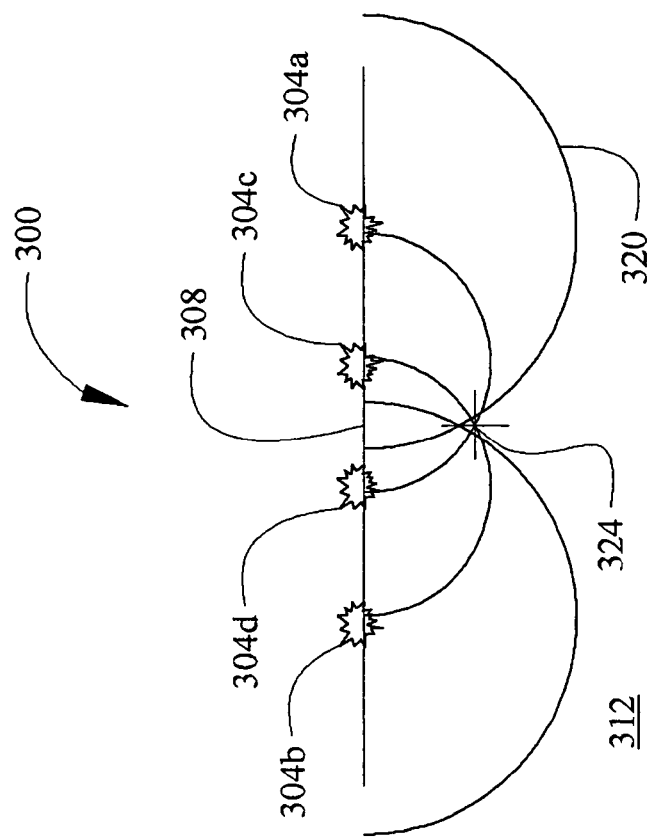
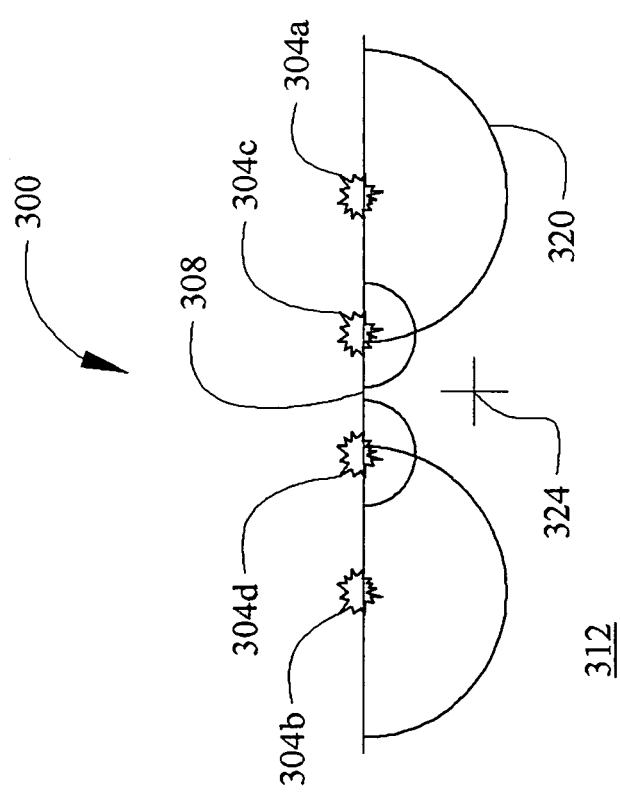
Fig. 4A
Fig. 4B

USING THERMAL BURSTS TO APPLY A COMBINED SHOCK WAVEFRONT TO STRUCTURAL BONDS

FIELD

The present invention relates to structures having parts which are bonded together and more particularly (but not exclusively) to using a plurality of thermal bursts to produce a combined shock wavefront for testing and/or breaking bonds within structures.

BACKGROUND

Composite structures and materials are frequently used in aerospace and other applications. Various components may be bonded together to form a composite structure. In aerospace applications, bonds between structural components generally are required to be of a known and certifiable strength. Bond strength can be tested in various ways. For example, in one known method for non-destructive testing, a laser burst is used to apply a shock load to a bonded joint in a structure. Measurements of surface motions of the structure resulting from the shock load are used to measure the strength of the bond. When a laser burst is used to apply a shock load to a material, an acoustic pulse typically starts with non-uniform intensity and spreads out into the material, approaching a spherical wavefront after a short distance. Accordingly, measurement of the results of such a pulse may have limited precision and resolution.

SUMMARY

In one implementation, the disclosure is directed to a system for applying a controlled stress on a joint in a structure. The system includes means for applying a plurality of thermal bursts in a designated timing sequence and trajectory pattern to produce a combined shock wavefront directed toward the joint.

In another implementation, a method of testing a bond in a structure includes selecting one or more target points in the bond. A plurality of aim points are selected on a surface of the structure. A plurality of thermal bursts are applied to the structure surface at the aim points in a timing sequence configured to produce a combined shock wavefront directed toward the one or more target points. An effect of the combined shock wavefront on the bond is evaluated.

In yet another implementation, the disclosure is directed to a method of breaking a bond in a structure. One or more target points are selected in the bond. A plurality of aim points are selected on a surface of the structure. A series of thermal bursts is applied to the structure surface at the aim points in a timing sequence configured to produce a combined shock wavefront directed toward the target points. The bursts are applied at one or more energy levels sufficient to break the bond.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

DRAWINGS

The present invention will become more fully understood from the detailed description and the accompanying drawings, wherein:

FIGS. 4A and 4B are cross-sectional views of an application of controlled stress to a structure in accordance with one implementation of the present disclosure;

DETAILED DESCRIPTION

The following description of various embodiments is merely exemplary in nature and is in no way intended to limit the invention, its application, or uses.

Although various implementations of the present disclosure are described with reference to composite materials and laminations, the disclosure is not so limited. Various implementations are contemplated in connection with metallic specimens and/or bonded ceramic specimens. Various configurations in accordance with the present disclosure may be used for testing welds, brazes, solder joints, and/or adhesive bonding. Furthermore, implementations are contemplated not only in aerospace applications but also in connection with other applications, including but not limited to automotive, shipbuilding, and surgical supply applications.

Various implementations of the disclosure are directed to applying a controlled stress on a joint in a structure. In one implementation, a plurality of thermal bursts are applied in a designated timing sequence and trajectory pattern to produce a combined shock wavefront directed toward the joint to create the controlled stress. The bursts could be applied, for example, using one or more lasers directed at selected aim points. Other or additional discharge sources include flash lamps. Additionally or alternatively, electric current from a capacitive discharge mechanism could be deposited into selected aim points to produce bursts. It should be noted that various sources capable of producing energy in pulses comparable to bursts produced by the foregoing sources could be used in various implementations of the disclosure.

Figure 1:
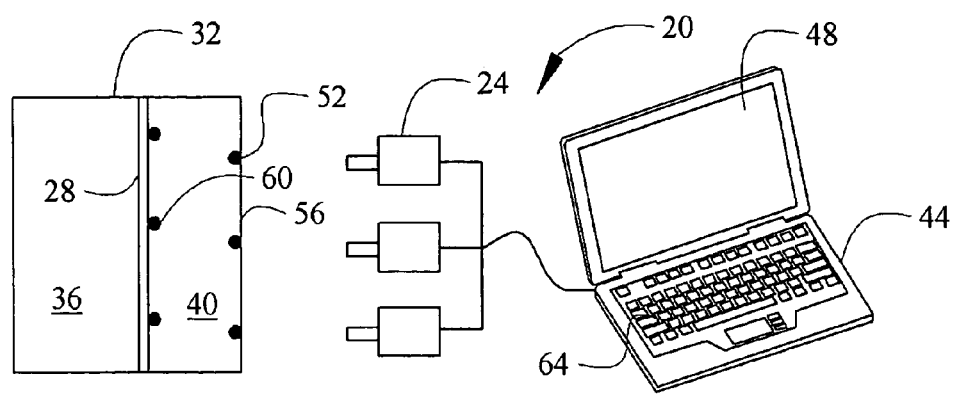
FIG. 1 is a diagram of a system for applying a controlled stress on a joint in a structure in accordance with one implementation of the disclosure.

One configuration of a system for applying a controlled stress is indicated generally in FIG. 1 by reference number 20. The system 20 includes a plurality of lasers 24 configured for applying a controlled stress on a bonded joint 28 in a structure 32. The structure 32 may be, for example, an aircraft part made of one or more composite materials. In one implementation of the present disclosure, the system 20 is used to measure the quality of the bond at the joint 28 between pieces 36 and 40 of the structure. Bond quality may be assessed by measuring acoustic reflection from, and/or acoustic transmission through, the joint 28. It should be noted generally that various configurations in accordance with the disclosure could be used in connection with coatings internal to a structure. Thus the terms "bond" and/or "joint" as used in this disclosure may be used to refer to such a coating.

The system 20 includes a computer 44 having a display 48. The lasers 24 are configured to apply a plurality of laser bursts in a designated timing sequence and trajectory pattern to produce a combined shock wavefront directed toward the joint 28 to create the controlled stress. A trajectory pattern may be defined, for example, by a plurality of aim points 52 on a surface 56 of the structure 32 and one or more target points 60 of the joint 28. In the configuration shown in FIG. 1, a plurality of target points 60 are indicated.

A user of the system 20 uses a keyboard 64 to input the designated timing sequence, trajectory pattern or other or additional information to the computer 44. The computer 44 may be programmed to use the designated timing sequence and trajectory pattern to provide, e.g., a display of an expected wavefront intensity relative to the structure 32. The computer 44 also may be configured to deliver the designated timing sequence and trajectory pattern to the lasers 24. Various calculations further described below may be performed automatically by the computer 44.

The computer 44 could be used, for example, to check whether a burst pattern is within the performance parameters of the system 20. It should be evident to those skilled in the art that various configurations of the system 20 are possible, including but not limited to configurations including more than one computer. The term "computer" includes but is not limited to a processor, mainframe, laptop, and/or combination of such devices. It should be noted that configurations also are possible in which one or more lasers 24 receive all or part of the designated timing sequence, trajectory pattern or other or additional information directly from a user of the system 20 without an intervening computer.

Figure 2:
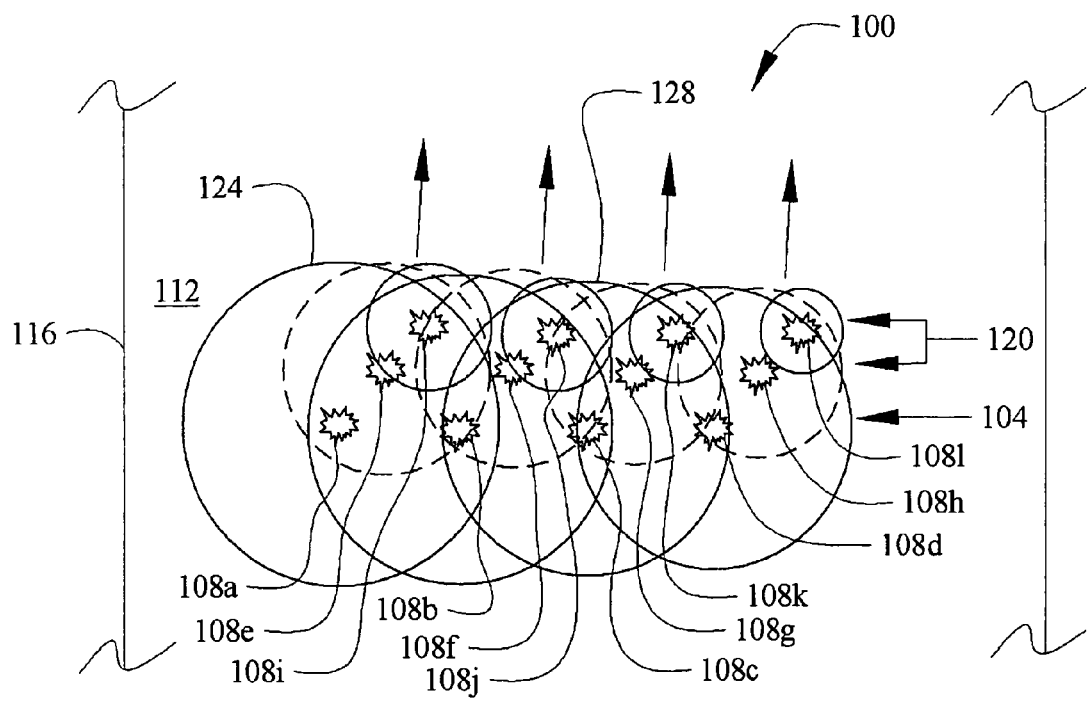
FIG. 2 is a plan view of an application of controlled stress to a structure in accordance with one implementation of the present disclosure.

A plan view of one implementation of applying a controlled stress is indicated generally in FIG. 2 by reference number 100. A phased array 104 of twelve laser bursts 108a-l is delivered to a surface 112 of a structure 116. Three rows 120 of four bursts 108a-l are produced. A first burst 108a occurs at lower left, followed by bursts 108b, 108c and 108d in sequence and progressing to the right. The sequence continues at the left with bursts 108e, followed by bursts 108f, 108g and 108h progressing to the right. The sequence then continues at the left with bursts 108i, followed by bursts 108j, 108k and 108l progressing left to right across the upper row 120. Shock waves 124 produced by the laser bursts 108 combine to form a highly directional pulsed plane wave 128 of acoustic energy moving upward and slightly to the right along the surface 112. In one implementation in which sound travels through a structure at about 1,000 meters per second, rows 120 may be separated in space by about 10 centimeters and separated in time by about 100 microseconds. It should be noted generally that estimates of burst spacing, intensity and timing in the present disclosure are exemplary only. It should be understood that burst timing, spacing, projection angles and intensity vary dependent on such factors as structure material, target location, and purpose for an implementation.

A burst timing sequence can be used to direct and/or shape a combined shock wave. For example, where the bursts of the array 104 are simultaneous or timed closely together, for example and in some materials, up to about two microseconds apart, a directional acoustic pulse could be made to move directly through the structure 116. Thus a phased array of bursts can be used to shape an acoustic wavefront inside a material specimen. Dependent, e.g., on spacing and timing, a combined shock wave produced by a laser array could be focused to a point beneath the surface 112 of the structure 116. In various implementations, a wavefront could be curved, straight, and/or focused to a target line, area and/or point. It should be noted generally that numbers, locations and/or timing of bursts may be varied in many different ways to shape and direct a combined shock wave. It should also be noted that bursts may be equally or unequally spaced and/or equally or unequally separated in time in an implementation.

Figure 3:
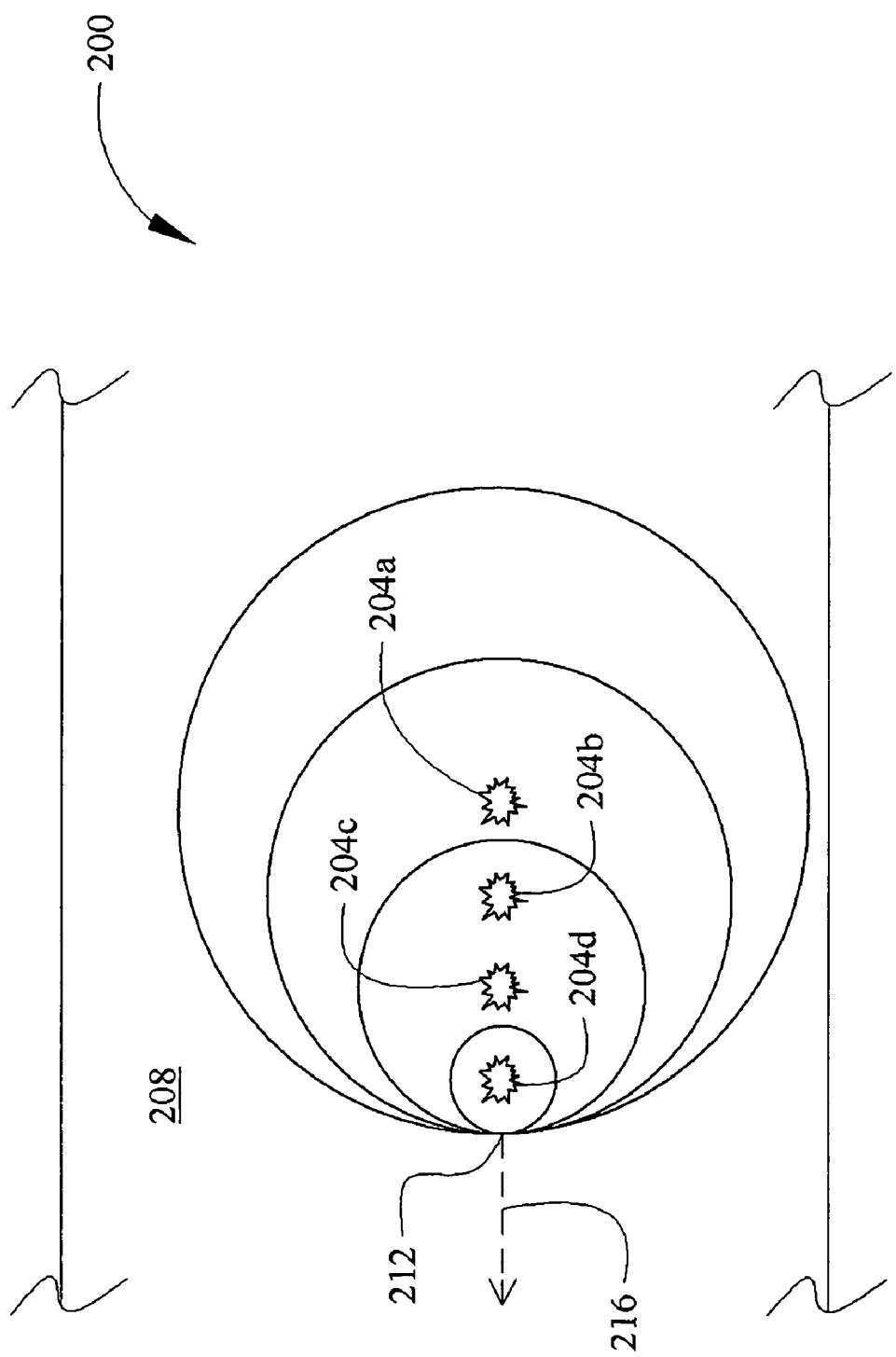
FIG. 3 is a plan view of an application of controlled stress to a structure in accordance with one implementation of the present disclosure.

A plan view of another application of controlled stress in accordance with the present disclosure is indicated generally in FIG. 3 by reference number 200. The application shown in FIG. 3 may be used, e.g., to check adhesion of a coating to a thin material such as sheet metal. A series of spaced laser bursts 204a-d are applied sequentially to a structural surface 208. Burst 204a is applied first, followed by bursts 204b, 204c, and 204d. The bursts 204 cause a point 212 of high acoustic stress to move in a line 216 along the surface.

Cross-sectional views of another application of controlled stress in accordance with the present disclosure are indicated in FIGS. 4A and 4B by reference number 300. A series of laser bursts 304 (four of which are shown in FIGS. 4A and 4B) are applied to a surface 308 of a structure 312 as shown in FIG. 4A. In the present example, speed of sound in the structure 312 is about 1000 meters per second Bursts 304a and 304b are applied substantially simultaneously. Aim points for the bursts 304a-304d are about 10 centimeters apart. About 73 microseconds after application of bursts 304a and 304b, bursts 304c and 304d are applied substantially simultaneously. The bursts 304 cause shock waves 320 to converge to a target point 324 of high acoustic stress about 8.8 centimeters below the surface 308 as shown in FIG. 4B. Thus a two-dimensional surface array of bursts can yield three-dimensional convergence of shockwaves to a single point.

An exemplary laser source is a neodymium-YAG laser, although other lasers providing short pulses could be used. A short pulse is desirable to produce a sharp acoustic wavefront and good resolution in imaging a target point. A short pulse is, e.g., about 10 nanoseconds, although pulses up to about one microsecond could be used. In various implementations, thermal energy of about one Joule is deposited in a burst. Pulse energy may vary dependent, e.g., on surface reflectivity to laser wavelength. In various implementations, pulse duration is sufficiently short that a resulting acoustic wave cannot cross the heated region before the pulse is over.

Figure 5:
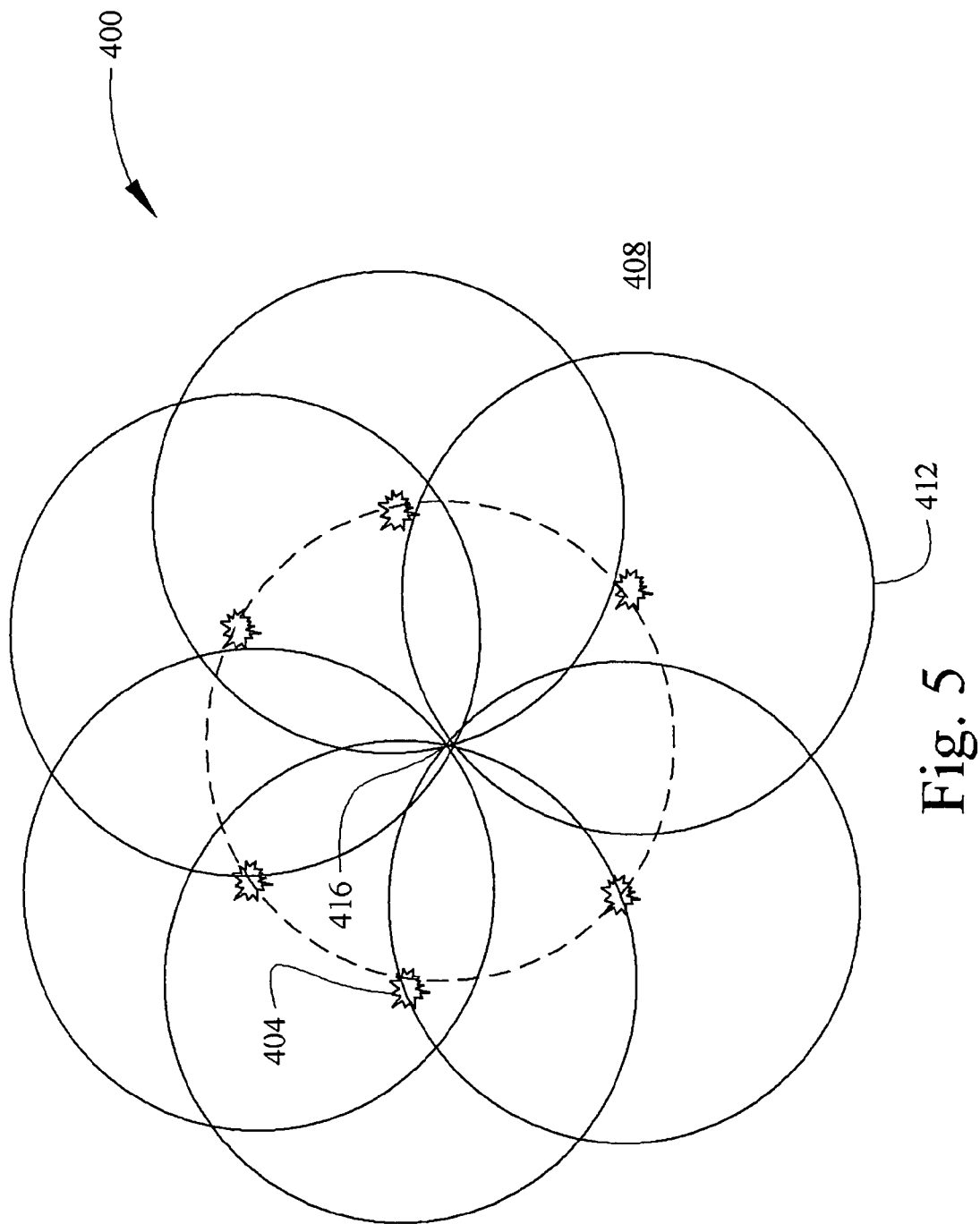
FIG. 5 is a plan view of an application of controlled stress to a structure in accordance with one implementation of the present disclosure.

A plan view of another application of controlled stress to a structure in accordance with the present disclosure is indicated generally in FIG. 5 by reference number 400. A plurality of laser bursts 404 are applied substantially simultaneously to a structural surface 408. Shock waves 412 converge to a point 416 on the surface 408 and also to a line (not shown) starting at the point 416 and extending perpendicularly into the structure.

Figure 6:
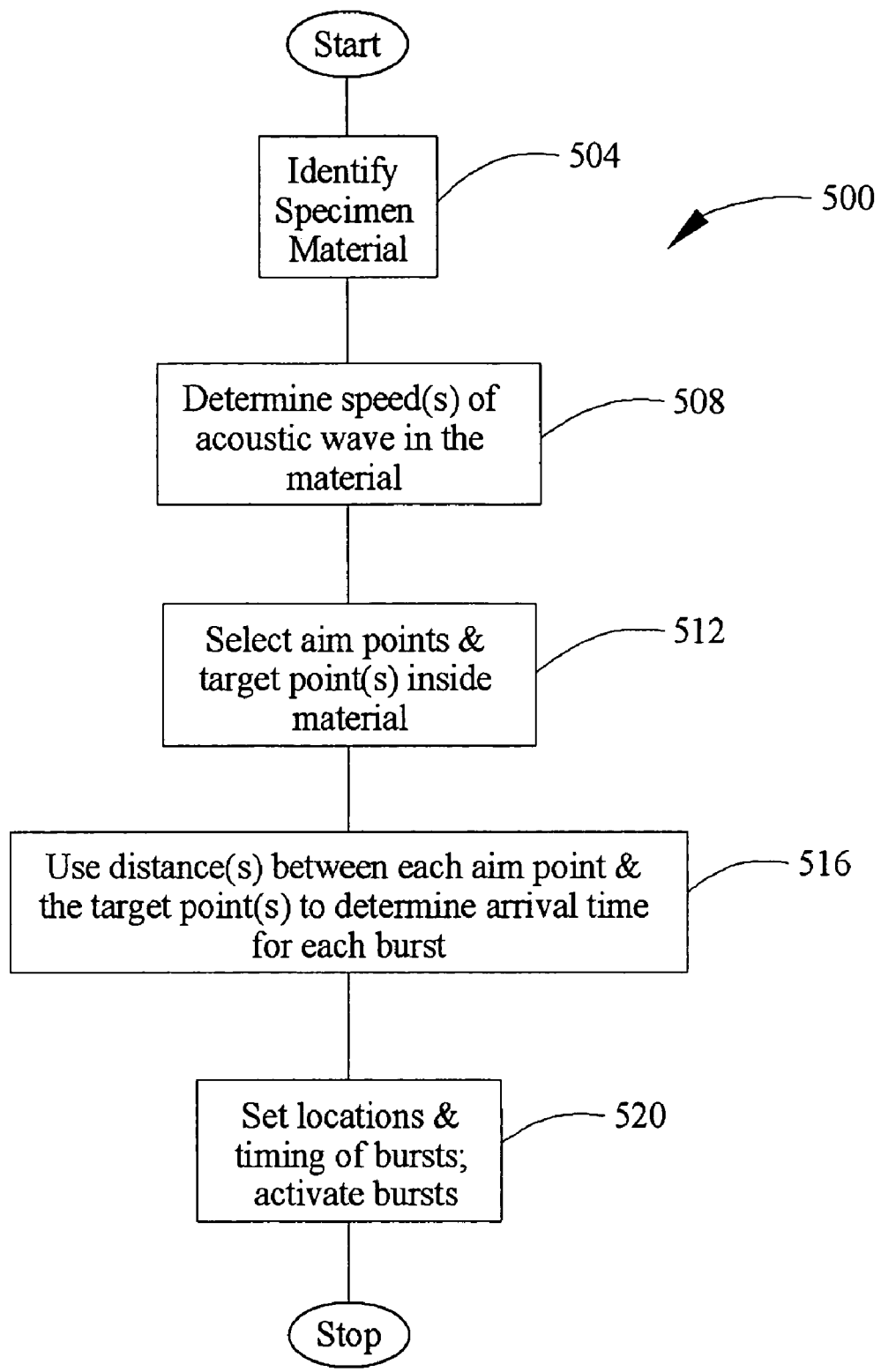
FIG. 6 is a flow diagram of a method of applying a controlled stress on a joint in a structure in accordance with one implementation of the present disclosure.

A flow diagram of one implementation of a method of applying a controlled stress on a joint in a structure is indicated generally in FIG. 6 by reference number 500. The method 500 may be used, e.g., for testing and/or breaking a bond in a structure and, in some implementations, repairing the structure. In step 504, a user identifies one or more specimen materials, i.e., the material(s) through which laser bursts applied to a surface of the material(s) are to travel. In step 508, speed(s) of acoustic waves in the material(s) are determined for use as further described below.

In determining acoustic wave speed(s), it may be desirable to make allowance for the fact that very strong shocks can propagate faster than the speed of sound. Such shocks may slow to sonic speed as they travel outward and become weaker. Temperature may also affect acoustic wave speed(s). It may also be desirable to allow for the fact that the speed of sound varies with frequency in some media, so the intensity of pulses typically diminishes with distance due to dispersion. Additionally, it may be desirable to account for anisotropy in the speed of sound in many composite materials.

In step 512, aim points on a surface of the structure and target point(s) inside the structure are selected. In an implementation in which a variable-energy laser is used, the user may also select energie(s) of the bursts. It should be noted that the bursts could have the same energy or different energies. In step 516, distance(s) between each aim point and the target point(s) are used to determine an arrival time for each burst to be applied. In step 520, the locations and timing of the bursts are set, e.g., by computer as described with reference to FIG. 1. In an implementation in which a variable-energy laser is used, selected energy of each burst may also be set. The bursts thereupon may be applied to create a controlled stress on the joint.

In one implementation of the disclosure, and referring to FIG. 1, a single laser 24 may be used to fire bursts in rapid succession, for example, a few microseconds apart. A beam steering mechanism of the laser 24 moves the beam rapidly from one aim point 52 to another. In another implementation, a single laser 24 is used to fire bursts in rapid succession at a single location. A mechanical system is used to move the structure 32 rapidly so that the bursts strike the surface 56 at aim points 52 in accordance with the selected trajectory pattern. Combinations of the foregoing laser configurations also are possible in various implementations.

Various implementations in accordance with the present disclosure can provide improved means for measuring the quality of bonds, laminations and other internal attributes of materials and objects. Increased accuracy in measuring the strength and quality of composite bonds and laminations can make it possible to reduce margins, and therefore weight, in products that include composite materials.

Implementations of the present disclosure can enable sensitive testing of locations within a sample, or even within an aircraft in the field. For example, multiple laser bursts could be used to generate an acoustic pulse that could be focused on a small region within a bond, thereby generating measurements with finer spatial resolution, and at lower laser power, than would be possible using a single laser burst. Alternatively, pulses could be made to move through a sample in several different directions, even though being produced on a single flat surface. Such an implementation could be used to reveal anisotropy within a bond, or could allow an acoustic pulse to be sent along a particular branch of a complex shape.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for applying a controlled stress on a joint in a structure, the system comprising means for applying a plurality of thermal bursts in a designated timing sequence and trajectory pattern to produce a combined shock wavefront directed toward the joint;
    means for using the designated timing sequence and trajectory pattern to provide a display of an expected wavefront intensity relative to the structure; and
    means for delivering the designated timing sequence and trajectory pattern to the applying means.

2. The system of claim 1, wherein the trajectory pattern includes a target pattern on a surface of the structure.

3. The system of claim 1, wherein the bursts are applied as a phased array.

4. The system of claim 1, wherein the combined shock wavefront includes a directional plane wave.

5. The system of claim 1, wherein the combined shock wavefront includes a curved wavefront.

6. The system of claim 1, wherein the combined shock wavefront is directed to converge to a line within the structure.

7. A method of testing a bond in a structure, the method comprising:
    selecting one or more target points in the bond;
    selecting a plurality of aim points on a surface of the structure;
    applying a plurality of thermal bursts to the structure surface at the aim points in a timing sequence configured to produce a combined shock wavefront directed toward the one or more target points; and
    evaluating an effect of the combined shock wavefront on the bond.

8. The method of claim 7, further comprising applying the bursts as a phased array.

9. The method of claim 7, wherein the combined shock wavefront includes a directional plane wave.

10. The method of claim 7, wherein the combined shock wavefront is directed to converge within the structure.

11. The method of claim 10, wherein the combined shock wavefront is directed to converge to a line within the structure.

12. The method of claim 7, wherein selecting one or more target points in the bond comprises selecting a plurality of target points such that the combined shock wavefront moves through the target points in different directions.

13. The method of claim 7, wherein applying the bursts comprises at least one of the following:
    using a beam-steering mechanism to move the beam of a single laser between two or more of the aim points;
    applying a plurality of the bursts while moving at least part of the structure and using a single laser to apply the plurality; and
    using a plurality of lasers to apply at least some of the bursts.

14. The method of claim 7, further comprising, based on the evaluating, performing at least one of the following: repairing the structure, rejecting the structure, and replacing the structure.

15. A method of breaking a bond in a structure comprising:
    selecting one or more target points in the bond;
    selecting a plurality of aim points on a surface of the structure;
    applying a series of thermal bursts to the structure surface at the aim points in a timing sequence configured to produce a combined shock wavefront directed toward the one or more target points;
    wherein the bursts are applied at one or more energy levels sufficient to break the bond.

16. The method of claim 15, further comprising applying the bursts as a phased array.

17. The method of claim 15, wherein the combined shock wavefront includes a directional plane wave.

18. The method of claim 15, wherein the combined shock wavefront is directed to converge within the structure.

19. The method of claim 18, wherein the combined shock wavefront is directed to converge to a line within the structure.

20. The method of claim 15, performed relative to repairing the structure.

21. The method of claim 15, wherein the bond includes one or more coatings within the structure.

* * * * *

UNITED STATES PATENT AND TRADEMARK OFFICE
CERTIFICATE OF CORRECTION

PATENT NO. : 7,574,916 B2 Page 1 of 1
APPLICATION NO. : 11/353407
DATED : August 18, 2009
INVENTOR(S) : Brian J. Tillotson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 576 days.

Signed and Sealed this

Seventh Day of September, 2010

David J. Kappos
*Director of the United States Patent and Trademark Office*